Sept. 9, 1969  H. E. RIORDAN ET AL  3,465,597
VIBRATING-COLUMN ACCELEROMETER
Filed May 25, 1965  2 Sheets-Sheet 1

HUGH E. RIORDAN
LEON WEISBORD
JEROME M. PAROS
INVENTORS

BY

*Thomas W. Kennedy*
ATTORNEY

Sept. 9, 1969     H. E. RIORDAN ET AL     3,465,597
VIBRATING-COLUMN ACCELEROMETER
Filed May 25, 1965     2 Sheets-Sheet 2
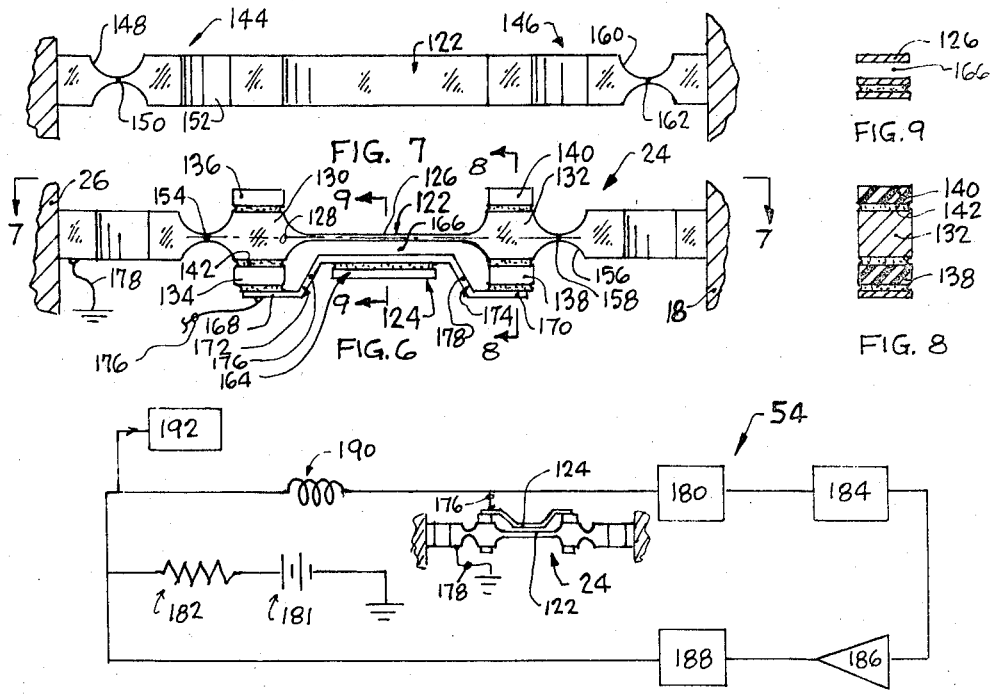
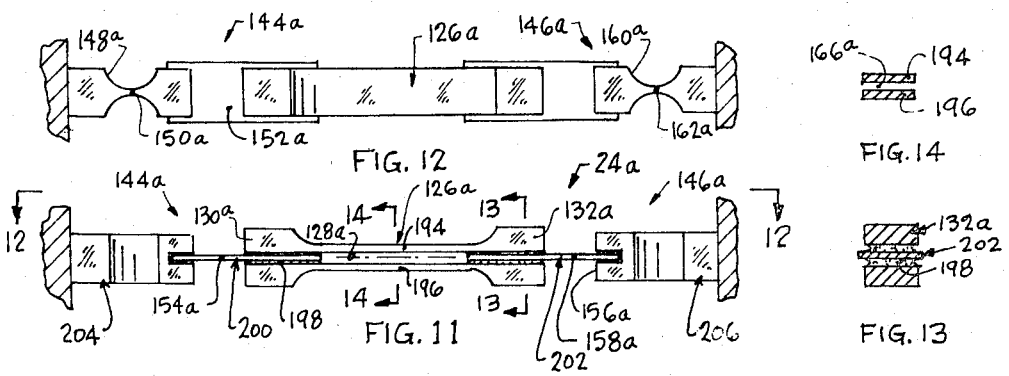
HUGH E. RIORDAN
LEON WEISBORD
JEROME M. PAROS
            INVENTORS
BY
*Thomas W. Kennedy*
    ATTORNEY 3,465,597
VIBRATING-COLUMN ACCELEROMETER
Hugh E. Riordan, Wyckoff, N.J., and Leon Weisbord and Jerome M. Paros, New York, N.Y., assignors to Singer-General Precision, Inc., Little Falls, N.J., a corporation of Delaware
Filed May 25, 1965, Ser. No. 458,538
Int. Cl. G01p 15/08
U.S. Cl. 73—517                                      12 Claims

ABSTRACT OF THE DISCLOSURE

This invention provides an accelerometer comprising a support member with a sensing axis, a proof mass coaxial therewith and displaceable relative thereto in an axial direction, a single-axis guide means interconnecting said proof mass and said support member; and at least one columnar element coaxial with said proof mass and said support member having a connection at one end of said proof mass and having a connection at its other end to said support member for transmission therebetween of an axial component of said acceleration force and for sensing said component. The guide means is a three-sided frame pendulum with a single hinge axis. The element is a vibrating tine with a slender center portion and enlarged end portions, which has a reflector tine or strip supported therefrom with a center portion parallel thereto forming a capacitive unit for use in a combination drive and pickoff means. With this construction, a number of the usual types of instrument errors can be substantially eliminated.

---

The present invention relates to accelerometers, and particularly to a vibrating-column accelerometer in which instrument errors are minimized.

A prior art vibrating column accelerometer is described in the U.S. Patent No. 2,928,668. Said pior art accelerometer comprises a pair of proof masses axially spaced and coaxial along a sensing axis, a support wall disposed between said proof masses having a pair of spring-hinged and restrained cantilever-arm elements on opposite sides thereof respectively supporting said proof masses, a pair of drive means for vibrating said elements at their resonant frequencies, and a pair of pickoff means for sensing the difference between the resonant frequencies of said elements in order to measure the acceleration force component which is directed along said sensing axis and which is proportional to said frequency difference.

One problem with said prior art accelerometer is that the causes of its instrument errors are inherent in its type of structure. One major error is caused by the acceleration force components which act on the proof masses in a direction transversely to the accelerometer sensing axis and which cause bending of said cantilevered vibrating elements.

Another problem with said prior art accelerometer is that the natural resonant frequency of the vibrating elements at zero acceleration input is dependent on the magnitudes of two proof masses. This is a serious short-coming because the sensitivity of such an instrument is not simply determined by the length of the cantilever arm or "reed" as the prior art invention claims, but by the relationship $$\frac{dW_1}{da} = \frac{1}{2}\sqrt{\frac{m_1}{k}}$$

where:

$m_1$ is the effective mass of the "reed" and
$k$ is its angular spring rate.

Now for an acceleration transverse to the sensing axis and in the plane of bending of the "reed," the angular deflection is $$\Delta = \frac{m_1 r a_c}{k}$$

where:

$a_c$ is the cross-axis acceleration and
$\Delta$ is the cross-axis deflection.

Thus, the sensitivity is seen to be dependent on cross-axis deflection produced by a cross-axis acceleration as follows:

$$k = \frac{m_1 r}{(\Delta/a_c)}$$

$$\frac{dW_1}{da} = \frac{2}{1}\sqrt{\frac{m_1}{mr^1/\left(\frac{\Delta}{a_c}\right)}} = \frac{2}{1}\sqrt{\frac{\Delta}{r a_c}}$$

Thus, said prior art accelerometer must, in order to provide high sensitivity, be permitted to be susceptible to high deflection under cross-axis accelerations; an obviously impractical requirement. This defect is inherent in the concept of using cantilever vibrating elements.

A further problem with the prior art accelerometer is the complexity of the mechanism required to maintain the vibrations of the sensitive element: said mechanism comprising separate pickup coil, driving coils and armature.

A still further problem with the prior art accelerometer resides in the use of a magnetic proof mass, thereby making the instrument susceptible to errors produced by stray external magnetic fields.

In the present invention, the dependence of sensitivity on cross-axis susceptibility is eliminated by using a fixed-fixed beam as the sensing element rather than a hinged cantilever arm, and by making the natural frequency of the sensing element independent of the proof mass by providing independent means of support for said proof mass, said independent support means consisfing of two pendulum arms, said pendulums being disposed oppositely relative to their sensing axis and relative to each other whereby an error due to angluar motion in one unit cancels the corresponding error in the other unit. In the present invention, simple driving means are used, consisting of a single electrode plate. Furthermore, the proof mass need not be of magnetic material.

Accordingly, it is one object of the invention to provide a vibrating-column accelerometer which has a low threshold level for sensing low-G acceleration forces.

It is another object of the invention to provide a vibratory digital accelerometer in which instrument errors are minimized, in particular said type of error due to cross-axis acceleration forces.

It is a further object of the invention to provide a self-driven, self-sensing resonant-column element for use in a vibrating-column force sensor such as the aforementioned accelerometer and which resonant-column element can conserve its own vibration energy and which can also isolate itself from error-inducing loads.

It is a still further object of the invention to provide a vibrating-column accelerometer with a self-driven, self-sensing element according to the aforementioned objects and in which said element has a sharply-defined, high-amplitude, single-peak type of resonant frequency.

To the fulfillment of these and other objects, the invention provides an acceleometer comprising a support member with a sensing axis, a proof mass coaxial therewith and displaceable relative thereto in an axial direction, a single-axis guide means interconnecting said proof mass and said support for transmission therebetween of a cross-axis component of an acceleration force, and at least one columnar element coaxial with said proof mass and said support member having a connection at one end to said proof mass and having a connection at its other end to said support member for transmission therebetween of an axial component of said acceleration force and for sensing said component.

Other objects of the invention will become apparent upon reading the annexed detailed description in connection with the drawings wherein like parts are designated by like numerals throughout the several views, and wherein:

FIG. 6 is an enlarged portion of FIG. 2;

FIG. 7 is a sectional view taken along the lines 7—7 of FIG. 6;

FIG. 8 is a sectional view taken along the line 8—8 of FIG. 6;

FIG. 9 is a sectional view taken along the line 9—9 of FIG. 6;

FIG. 10 is a circuit connecting to a portion of FIG. 6;

FIG. 11 is an alternate embodiment of said portion shown in FIG. 6;

FIG. 12 is a sectional view taken along the line 12—12 of FIG. 11;

FIG. 13 is a sectional view taken along the line 13—13 of FIG. 11; and

FIG. 14 is a sectional view taken along the line 14—14 of FIG. 11.

Figure 2:
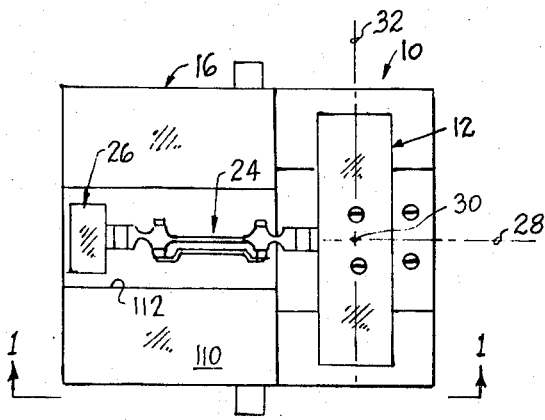
FIG. 2 is a sectional view taken along the line 2—2 of FIG. 1.
Figure 5:
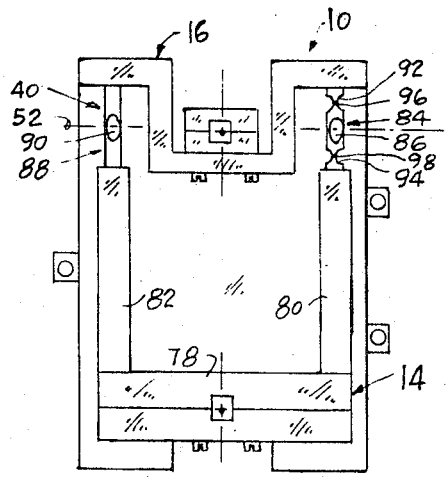
FIG. 5 is a sectional view taken along the line 5—5 of FIG. 1.
Figure 1:
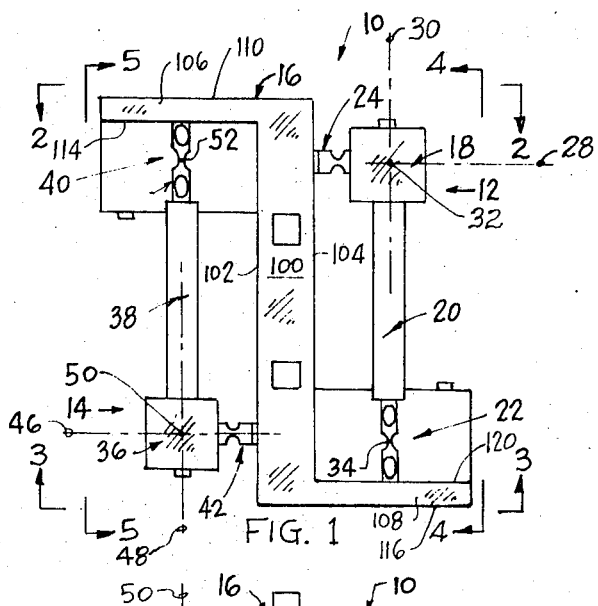
FIG. 1 is a sectional view of an accelerometer embodying features of the present invention.
Figure 4:
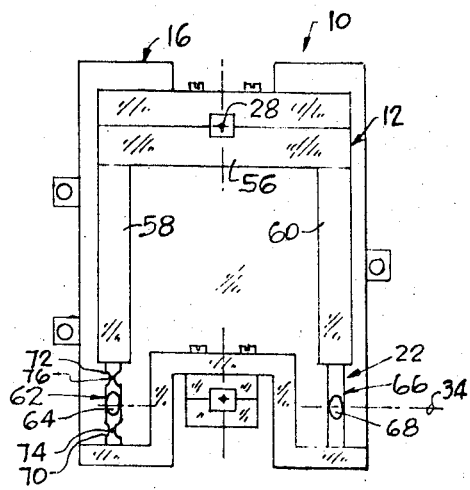
FIG. 4 is a sectional view taken along the line 4—4 of FIG. 1.
Figure 3:
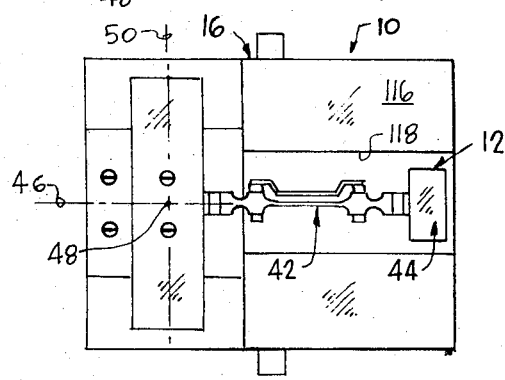
FIG. 3 is a sectional view taken along the line 3—3 of FIG. 1.

Referring to FIGS. 1 through 10, accelerometer 10 includes a first accelerometer unit 12 and also a second accelerometer unit 14, which are mounted on opposite sides of a common support structure 16.

Unit 12 (FIG. 1) has a proof mass 18, which is fixedly connected to a pendulum-type guide or suspension means 20 for support therefrom. Pendulum 20 has a hinge means 22 connecting to structure 16. Proof mass 18 is fixedly connected to a vibrating columnar element 24 at one end thereof. Column 24 has a clamp 26 at its opposite end for connection of column 24 to structure 16. Unit 12 also has an X-axis 28, which is the unit's sensing axis; and has a Y-axis 30 and a Z-axis 32 in quadrature therewith. Hinge means 22 has a hinge axis 34, which is parallel to Z-axis 32.

Unit 14 (FIG. 1), which is preferably identical to unit 12, similarly has a proof mass 36, which is also fixedly connected to its pendulum 38 for support therefrom. Pendulum 38 has a hinge means 40 connecting to structure 16. Proof mass 36 is fixedly connected to a vibrating columnar element 42 at one end thereof. Column 42 also has a clamp 44 at its opposite end for connection of column 42 to structure 16. Unit 14 also has an X-axis 46, which is the unit sensing axis; and has a Y-axis 48 and a Z-axis 50 in quadrature therewith. Hinge means 40 also has a hinge axis 52, which is parallel to Z-axis 50.

Columnar element 24 (FIGS. 1, 6) has a drive and pickoff means 54 (FIG. 10); while element 42 has a corresponding drive and pickoff means (not shown). Units 12 and 14 are arranged so that their X-axes 28 and 46, Y-axes 30 and 48, and Z-axes 42 and 50 are respectively parallel to each other. Units 12 and 14 are also arranged so that elements 24 and 42 point in opposite directions relative to each other and relative to their parallel X-axes 28, 46. Units 12 and 14 are also arranged so that pendulums 20 and 38 point in opposite directions relative to each other.

Pendulum 20 (FIG. 4), which is a U-shaped symmetrical frame in cross-section, has a cross beam 56, which is disposed parallel to Z-axis 32 and has a pair of spaced posts 58, 60 which are fixedly connected to beam 56 at the ends thereof. Pendulum hinge means 22 (FIG. 4) includes a flexure member 62 at the bottom of post 58 with a necked-down portion 64 coaxial with hinge axis 34. Hinge 22 also includes a flexure member 66 at the bottom of post 60 with a necked-down portion 68 also coaxial with hinge axis 34. Flexure member 62 also has pair of necked-down portions 70, 72, which are disposed on opposite ends of flexure member 62, and which have respective coplanar hinge axes 74, 76, that are disposed in a plane normal to hinge axis 34 for avoiding resistance to a thermal expansion of beam 56 relative to structure 16.

Pendulum 38 (FIG. 5), which is preferably identical to pendulum 20, similarly has a cross beam 78 and a pair of posts 80, 82. Pendulum hinge 40 includes a flexure member 84 with a necked-down portion 86 coaxial with pendulum hinge axis 52, and also includes a flexure member 88 with a necked-down portion 90 also coaxial with pendulum hinge axis 52. Flexure member 84 also has a pair of necked-down portions 92, 94 with respective hinge axes 96, 98 for relieving the corresponding thermal expansion of beam 78 relative to structure 16.

Structure 16, which has a Z-shaped profile (FIG. 1), includes a central wall 100 with axially-spaced sides 102, 104, which are disposed in planes normal to said X-axes 28, 46. Structure 16 has an upper slab portion 106, which cantilevers outwardly from side 102. Structure 16 also a lower slab portion 108, which cantilevers outwardly from side 104 and which is parallel to slab 106.

Upper slab 106 (FIGS. 1, 2) has an axially-outwardly-facing side 110 with a groove 112 which receives clamp 26. Slab 106 also has an axially-inwardly-facing side 114 on which pendulum flexure members 84, 88 are mounted. Lower slab 108 (FIGS. 1, 3) also has an axially-outwardly-facing side 116 with a groove 118, which receives clamp 44. Slab 108 also has an axially-inwardly-facing side 120 on which pendulum flexure members 62, 66 are mounted.

With such a suspension arrangement for proof masses 18, 36, pendulums 20, 38 can expand longitudinally in an axial direction away from their respective hinge axes 34, 52, and thereby relieve internal thermal expansion forces. In this way, excessive thermal stresses in pendulums 20, 38, proof masses 18, 36 and columnar elements 24, 42 are substantially minimized.

In addition, with such arrangement of units 12 and 14, error due to cross-axis acceleration force can be minimized. For example, referring to FIG. 1, assume an acceleration force acts on accelerometer 10 in a diagonal direction so that it has a horizontal force component acting to the left in FIG. 1, and it has a vertical force component acting in a downward direction. Due to said horizontal force component, proof mass 18 and proof mass 36 will each be deflected slightly to the left. Due to said vertical force component, in FIG. 1, proof mass 18 will cause a counter-clockwise moment above axis 34 and proof mass 36 will cause a counter-clockwise moment about its axis 52. Said counter-clockwise moments will cause both columnar elements 24 and 42 to be compressed. Since proof mass 18 and pendulum 20 are preferably identical to proof mass 36 and pendulum 38, respectively, said counter-clockwise moments are substantially identical whereby the compression loads in columnar elements 24 and 42 are substantially identical and also substantially cancel each other. Thus, with such arrangement in which first unit 12 is arranged in an inverted or upside-down orientation relative to second unit 14, error due to cross-axis components of an acceleration force on accelerometer 10 can be substantially minimized.

Columnar element 24 (FIGS. 6–9), which is identical to columnar element 42, will only be described hereafter in detail. Element 24 has a vibrating tine 122, which is supported by proof mass 18 at one end by clamp 26 at its other end. Element 24 also has a dummy tine or reflector strip 124, which is supported from vibrating tine 122.

Vibrating tine 122 (FIGS. 6, 7, 9), which is preferably composed of a spring metal, such as a nickel iron alloy metal, or the like, has a center portion 126 with a longitudinal axis 128, and also has a pair of enlarged end portions or lobes 130, 132 that are coaxial therewith. Axis 128 is colinear with X-axis 28 at accelerometer null condition. Tine 122 preferably has a rectangular cross-section and preferably has a substantially uniform width for ease of manufacture.

Ends 130, 132 (FIG. 6) have respective universal tially larger in thickness than the thickness of center portion 126. Ends 130, 132 also have a substantially larger moment of inertia than the moment of inertia of center portion 126. With this construction, the transmission of vibration energy from center portion 126 in an axially outward direction therefrom can be substantially minimized thereby improving the quality factor of tine 122. In addition, center portion 126 has substantially equal end-moment restraints. With such construction, center portion 126 can deflect transversely in a symmetrical arcuate shape. In this way, sensing of the vibration frequency of center portion 126 is facilitated.

End 130 (FIG. 6), has a pair of insulators 134, 136, which are disposed on radially opposite sides thereof. End 132 also has a corresponding pair of insulators 138, 140, which are also disposed on radially opposite sides thereof. Insulators 134, 136, 138, 140, which are preferably composed of a glass or ceramic material, or the like, are preferably bonded to tine 122 by an adhesive 142, such as an epoxy resin cement, or the like.

Ends 130, 132 (FIG. 6) have respective universal joints 144, 146, which are disposed on the axially outward sides thereof. Joint 144 is fixedly connected to clamp 26 and joint 146 is fixedly connected to proof mass 18. Joint 144 has a necked-down portion 148 with an axis 150, which is disposed at right angles to axis 28. Joint 144 also has a necked-down portion 152 with an axis 154, which is disposed at right angles to a plane including axes 150 and 28. Joint 146 similarly has a necked-down portion 156 with an axis 158, which is disposed at right angles to axis 28. Joint 146 also has a necked-down portion 160 with an axis 162, which is disposed at right angles to a plane including axes 158 and 28. With such construction, tine 122 is isolated from any moment, motion or creep of structure 16 or of proof mass 18.

Reflector strip 124 (FIGS. 6, 8, 9) is also composed of a spring metal. Strip 124 has a center portion 164 which is disposed adjacent to and parallel to center portion 126 and which is separated therefrom by a substantially uniform gap 166. Strip 124 also has end portions 168, 170, which are fixedly bonded by an adhesive 142 to respective isolators 134, 138. Reflector 124 also has Z-shaped bend portions 172, 174 which are respectively connected to ends 168, 170 and are connected to center portion 164. Bends 172, 174 have respective points of inflection 176, 178, about which rotation occurs when a slight axial load is applied on element 24.

Ends 168, 170 and bends 172, 174 preferably have an equal thickness which is preferably about 0.001 inch. Center portion 164 has a thickness of about two times to ten times the thickness of bends 172, 174, and which is preferably about 0.004 inch. Reflector 124 is preferably a laminate strip of 0.001 inch thickness, which has an additional strip of a thickness equal to 0.003 inch that is bonded thereto at its center portion 164 by an adhesive 142. With such a laminate construction, strip 124 has more damping capacity and is stiffer than tine 122 whereby sensing of a pickoff signal from tine 122 is facilitated.

With such construction of element 24, tine 122 and strip 124 can function as two adjacent plates of a capacitor in its drive and detection means 54 (FIG. 10).

With such construction of element 24, since strip 124 is supported by tine 122, a relative motion or distortion of slab 106 or its structure 16 relative to element 24 will not cause a corresponding relative movement between tine 122 and strip 124 so that tine 122 has a fixidity relative to strip 124 which is independent of structure 16.

With this construction of element 24, tine 122 provides substantially the greater part, and strip 124 provides practically no part, of the axial reaction to an axial acceleration force on element 24 whereby the share of load carried by tine 122 is consistently measurable.

With the construction of element 24, bends 172, 174 are rotatable and act like dummy hinges whereby a long term creep or thermal expansion of strip 124 does not affect the frequency sensitivity or resonant frequency level of tine 122.

In addition with such construction of element 24, tine 122 provides a single-peak resonant frequency response, which is clearly distinguishable from the resonant frequency of reflector strip 124.

Drive and pickoff means 54 (FIG. 10), which is connected to element 24, is identical to the drive and pickoff means (not shown), that is connected to element 42. Drive and pickoff means 54 will only be described hereafter in detail. Drive and pickoff means 54 (FIGS. 6, 10) has a lead 176, which is connected to strip 124; and has a ground lead 178, which is connected to tine 122. Element 24 acts as a capacitive unit. The air in pulsating gap 166 is a dielectric, which is sandwiched between tine 122 and strip 124. Gap 166 varies in thickness at the resonant vibration frequency of tine 122.

Drive and pickoff means 54 is illustrated by the circuit in FIG. 10; and includes an R-F oscillator 180, which is connected to a D-C voltage 181 through a resistor 182. Drive and pickoff means 54 also includes an FM discriminator 184, an A-F amplifier 186, and a 90 degrees phase shifter 188, which are connected to oscillator 180 in series.

Drive and pickoff means 54 also has a choke coil 190 and a frequency meter 192, which indicates the vibration frequency of tine 122. Element 24 forms the capacitive unit in oscillator 180, which has an LC tank circuit (not shown).

With the construction of element 24, a simplified drive and pickoff means 54 in which element 24 acts as the capacitive unit, can be used. In addition, the need for a separate drive means and a separate pickoff means is also avoided.

An alternate embodiment of element 24 is illustrated in FIGS. 11–14. Like parts of embodiment 24a, corresponding to element 24, have like numerals, with a subscript a added thereto.

Element 24a has a center portion 126a with a longitudinal axis 128a, and has a pair of end portions 130a, 132a, which are coaxial with center portions 126a. Ends 130a, 132a have respective universal joints 144a, 146a. Joint 144a has a necked-down portion 148a with an axis 150a; and also has a necked-down portion 152a with an axis 154a. Joint 146a has a necked-down portion 156a with an axis 158a, and has a necked-down portion 160a with an axis 162a.

Element 24a (FIG. 11), which is a fabricated assembly, has a pair of identical tines 194, 196, which are bonded by an adhesive 198 in back-to-back arrangement to a pair of plates 200, 202. Element 24a also has a pair of connection members 204, 206, which are fixedly connected to respective plates 200, 202 by adhesive 198, and which are preferably of metal construction. Tines 194, 196 and connections 204, 206 are composed of metal, while plates 200, 202 are composed of an electrically-insulating material whereby element 24a also forms a capacitor.

With the construction of alternate embodiment 24a, a cross-axis force component causes tines 194, 196 to deflect equally in amount in a transverse direction. In this way, a differential deflection between tines 194, 196 is avoided whereby instrument error is minimized.

In summary, a vibrating-column accelerometer is provided which has a low threshold level for sensing low-G acceleration forces and in which instrument errors are minimized, in particular that error due to cross-axis acceleration force. Said accelerometer has a self-driven, self-sensing columnar element, which can conserve its vibration energy, which can isolate itself from error-inducing loads, and which can provide a sharply-defined, high-amplitude, single-peak type of resonant frequency response.

While the present invention has been described in a preferred embodiment, it will be obvious to those skilled in the art that various modifications can be made therein within the scope of the invention; and it is intended that the appended claims cover all such modifications.

What is claimed is:

1. An accelerometer comprising a support member having a sensing axis and a proof mass spaced from and movable with respect to said support member along said axis, guide means extending generally perpendicular to said axis and interconnecting said proof mass and said support member, said guide means being pivotal near its connection to said support member to facilitate movement of said proof mass along said axis, vibratory transducer means substantially along said axis and having its respective ends connected to said support member and to said proof mass whereby accelerations of said accelerometer along said axis is effective to produce axial stresses in said transducer to affect its resonant frequency of vibration, said guide means comprising a pendulum having a three-sided frame including an elongated cross beam connecting to said transducer means and a pair of spaced posts having respective flexure members connecting to said support member with a common hinge axis, at least one of said posts having an additional flexure member for permitting freedom of motion of said pendulum about an additional axis normal to said common hinge axis whereby thermal expansion stresses in said elongated cross beam may be relieved.

2. In combination, a pair of substantially identical accelerometers each as claimed in claim 1 with their sensing axes arranged parallel to each other and with their sensing axes arranged parallel to each other and their transducer means extending from their respective proof masses and pointing in opposite axial directions and with their pendulums extending from their proof masses and pointing in opposite cross-axes directions.

3. An accelerometer as claimed in claim 1, in which said connections of the transducer means are hinge type connections whereby said transducer means is self-isolating.

4. An accelerometer as claimed in claim 1, in which said transducer means has a slender center portion and as enlarged end portions whereby the moment of inertia corresponding to the cross-section of said end portions is substantially greater than the moment of inertia corresponding to the cross-section of said center portion so as to reflect vibration energy toward said center portion and minimize loss of vibration energy through said end portions of said transducer.

5. An accelerometer comprising a support member having a sensing axis and a proof mass spaced from and movable with respect to said support member along said axis, guide means extending generally perpendicular to said axis and interconnecting said proof mass and said support member, said guide means being pivotal near its connection to said support member to facilitate movement of said proof mass along said axis, vibratory transducer means substantially along said axis and having its respective ends connected to said support member and to said proof mass whereby accelerations of said accelerometer along said axis is effective to produce axial stresses in said transducer to affect its resonant frequency of vibration, wherein said transducer means has a vibrating tine with a center portion and a pair of end portions and said transducer means has a reflector tine with a center portion separated from the center portion of the vibrating tine by a uniform gap and with end portions having electrical insulators connecting to said ends of the vibrating tine whereby a drive and pickoff means can be supported on said tines.

6. An accelerometer as claimed in claim 5, and including a dielectric medium disposed in said gap between said tines whereby said transducer means is a capacitor.

7. A self-driving, self-sensing force sensor comprising:
a first body with an axis;
a second body coaxial therewith and axially spaced therefrom;
means supporting said second body from said first body adapted to permit movement of said first body relative to said second body in an axial direction;
at least one elongate columnar element with a span extending between said first and second bodies with one end connecting to said first body and with an opposite end connecting to said second body for transfer of axial force therebetween; and
combination drive and pickoff means disposed spaced from the mid-span of said element and supported by said element for reversibly bending said element in a cantenary profile at the resonant vibration frequency of said element and for sensing variations thereof due to said force transfer therethrough.

8. The combination of a columnar element having a single elongated vibratory central tine and integral enlarged end portions, each end portion having a hinge intermediate its ends, and reflector means mounted on at least one end portion of said element for vibrating said central tine at its resonant frequency and for measuring the change in resonant frequency level thereof for use in a force sensor having a pair of spaced relatively-displaceable portions connecting to opposite ends of said element.

9. The combination as claimed in claim 8, in which said reflector means is a strip having a central tine portion disposed parallel to said central tine of said element and having end portions respectively fixedly connecting to said end portions of said element and electrically insulated therefrom and having bend portions respectively disposed between each of its end portions and its central portion whereby said strip has substantially no stiffness in an axial direction relative to the axial stiffness of said element.

10. The combination of a dual-tine columnar element for connection to a pair of spaced relatively movable portions of a force sensor and a combination drive and pickoff means having a circuit including an oscillator in which said tines of said element form a capacitor connected in the frequency determining circuit of said oscillator.

11. An accelerometer comprising:
a proof mass with three axes in quadrature;
a support member coaxial with said proof mass along one of said axes;
a pendulous arm coaxial with said proof mass along another of said axes and having an axially inner end fixedly connecting to said proof mass and having an axially outer end with pivot means with hinges along two axes fixedly connecting to said housing; and
at least one columnar element coaxial with said proof mass and disposed along one of said axes and having an axially inner end fixedly connecting to said proof mass and having an axially outer end fixedly connecting to said support for sensing the component of an acceleration force acting on said proof mass which is coaxial with said element.

12. An accelerometer comprising:

a pair of identical accelerometer units, in which each unit comprises a proof mass, a pendulum having a U-shaped frame with a cross beam and a pair of spaced posts having flexure members with a common hinge axis, and a columnar element including a vibrating tine having one end connecting to the proof mass and an opposite end clamped to the structure and having a slender center portion, together with a reflector strip mounted on said tine ends and disposed parallel to and separated from said center portion by a uniform gap, and insulated therefrom to form a capacitor of a combination drive and pickoff means, and in which said pair of units are arranged so that their elements point in opposite directions and their pendulums point in opposite directions relative to each other; and a common support structure including a central wall with axially spaced sides, an upper slab cantilevered from one of said sides on which one unit is mounted, and a lower slab cantilevered from the other of said sides on which the other unit is mounted.

References Cited

UNITED STATES PATENTS

| | | |
|---|---|---|
| 3,002,391 | 10/1961 | Holmes. |
| 3,081,637 | 3/1963 | Gevas _____ 73—517 |
| 3,093,760 | 6/1963 | Tarasevich. |
| 3,111,036 | 11/1963 | Kistler _____ 73—517 |
| 2,094,062 | 9/1937 | Darlington. |
| 2,477,085 | 7/1949 | Rieber. |
| 3,071,008 | 1/1963 | Steele _____ 73—517 XR |
| 3,091,972 | 6/1963 | Johnston _____ 73—517 |
| 3,190,129 | 6/1965 | Kritz et al. _____ 73—517 |
| 3,238,789 | 3/1966 | Erdley _____ 73—517 |

FOREIGN PATENTS

| | | |
|---|---|---|
| 871,553 | 6/1961 | Great Britain. |

JAMES J. GILL, Primary Examiner